E. W. STULL.
GEAR CASE CONSTRUCTION.
APPLICATION FILED MAR. 31, 1910.
1,105,219.
Patented July 28, 1914.
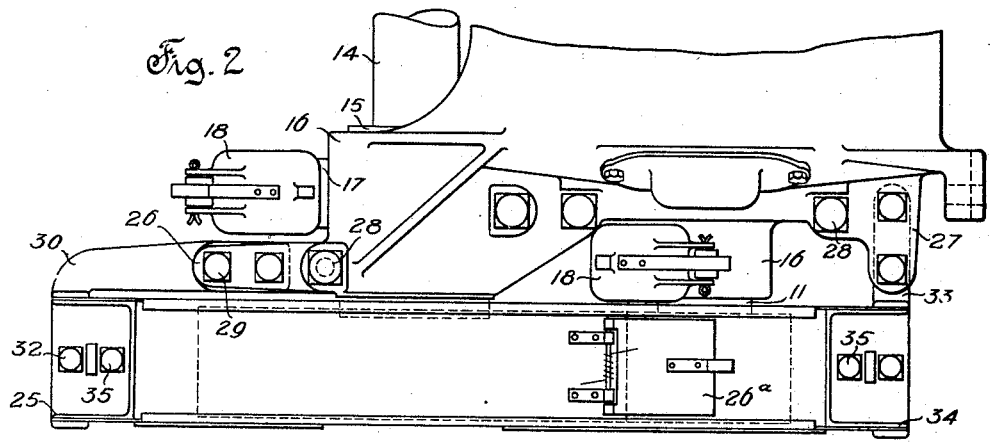
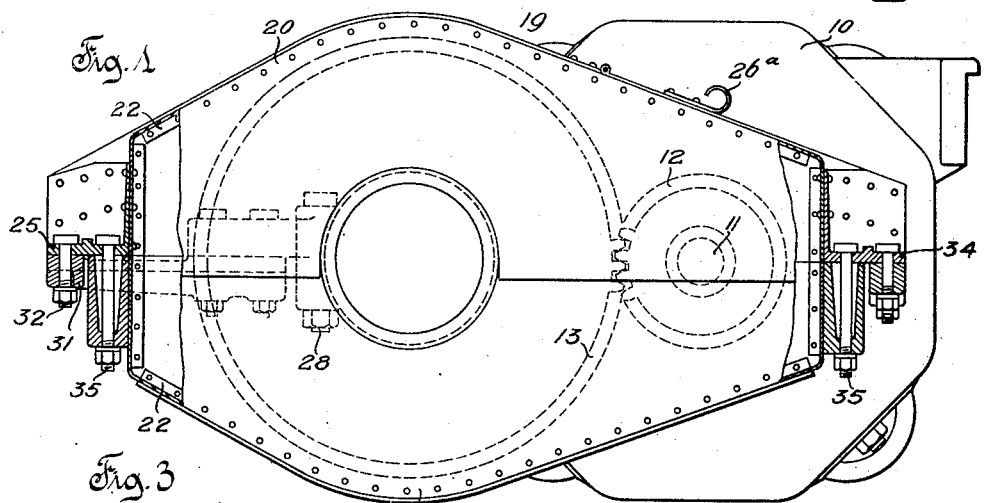
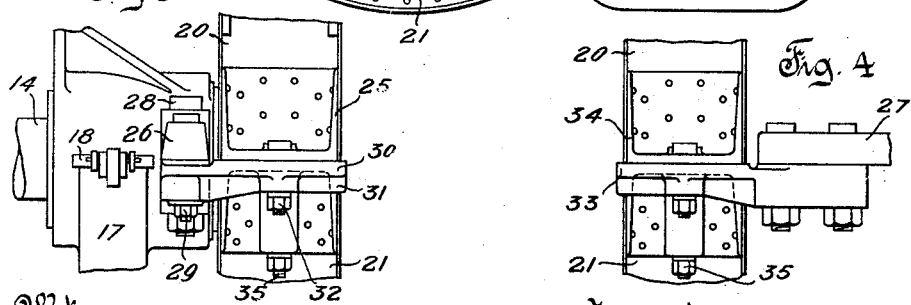
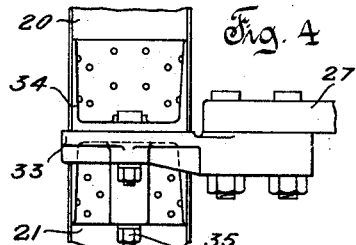
Witnesses
Rob. E. Stoll
Chas. L. Byron
Inventor
Emmett W. Stull
By Chas. E. Lord
Attorney
THE NORRIS PETERS CO., PHOTO-LITHO., WASHINGTON, D. C.

UNITED STATES PATENT OFFICE.

EMMETT W. STULL, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

GEAR-CASE CONSTRUCTION.

1,105,219.  Specification of Letters Patent.  Patented July 28, 1914.

Application filed March 31, 1910.  Serial No. 552,692.

*To all whom it may concern:*

Be it known that I, EMMETT W. STULL, a citizen of the United States, residing at Milwaukee, in the county of Milwaukee and State of Wisconsin, have invented certain new and useful Improvements in Gear-Case Constructions, of which the following is a full, clear, and exact specification.

My invention relates to gear casings and supporting means therefor.

Heretofore in the construction of some motor frames, especially in the case of compressors, the gear casings and field magnet frames have been cast integral with each other. In this practice it is usual to cast the field magnet frame and also the gearing casing in two halves or parts. Where the gear and motor casing are cast integral the lower half of the gear casing is cast integral with the lower half of the motor casing, and similarly the upper half of the gear casing with the upper half of the motor casing. In other constructions, more particularly in railway motors, gear casings are formed and supported entirely independent of motor casings.

There are other simple and practical ways for connecting and supporting motor and gear casings, and it is the object of my invention to provide novel supporting means for motor and gear casings of dynamo-electric machines.

My invention further consists in certain novel details of construction and combinations and arrangements of parts to be described in the specification and particularly set forth in the appended claim.

In the accompanying sheet of drawings, Figure 1 is an end elevation, partly in section, of a railway motor casing embodying my invention; Fig. 2 is a fragmentary top elevation of the same; and, Figs. 3 and 4 are detailed end views showing means of support between the motor and gear casings.

Located within and extending through a motor casing 10 is an armature shaft 11 which is provided at one end with a gear wheel 12. Meshing with this gear 12 is another gear 13 of greater dimensions which is mounted on a car wheel axle 14. The car wheel axle 14 and shaft 11 are provided with bearings located in bearing housings 16, and also with oil containing receptacles 17 having covers 18. The gear wheels 12 and 13 are inclosed by a divisible casing 19 which is preferably formed of sheet metal pieces riveted together. The casing is preferably divided into two parts, an upper 20 and a lower 21, the two parts slightly overlapping, the upper part being on the outside. The side sheets and end strips of metal which form the gear casing are securely fastened together by angle iron pieces 22 and rivets. The gear casing 19 has an opening which is provided with a cover 26ª and is so located that the gears may be inspected where they mesh. The gear casing is further provided with brackets 25 and 34 which are secured thereto and at opposite ends thereof.

The motor casing 10 is provided with two projections 26 and 27 respectively, which are located on opposite sides of the motor. Passing through these projecting portions 26 and 27 are bolts 28, which assist in retaining the two parts of the casing in a fixed position. Secured to the projection 26, preferably by bolts 29, is a supporting member 30, which extends from the motor casing to the gear casing 19. The supporting member 30 is preferably L-shaped and reinforced by its flanged portion 31. That part of the supporting member 30 which engages the gear casing is located directly under the bracket 25 and is secured to the upper half 20 of the gear casing by a bolt 32. At the opposite side of the motor casing and extending between said casing and the gear casing is another supporting member 33. This member 33 consists of a straight bar and is secured to the other projection 27 of the motor casing and also to the bracket 34 in a manner similar to that of the other side. The lower part of the gear casing is fastened to the upper part 20 of the gear casing by bolts 35. It is seen that the lower part 21 of the gear casing is secured to the upper part 20 thereof entirely independent of the supporting members extending from the motor casing to the gear casing. If it is desired to remove the lower part of the gear casing to inspect the gears it can be done without disturbing the upper half of the gear casing, supports 30 and 33, or any other parts.

It is to be noted that the motor and gear casings are constructed independent of each other and when assembled for service are connected together by the supporting members 30 and 33 respectively which support the casings mutually. By means of this arrangement the two practically independent parts are held together in a rigid manner to form a unit which provides for easy inspection and has many desirable commercial advantages.

There may be many modifications of the precise form herein shown and described, and I aim in my claim to cover all such modifications which do not involve a departure from the spirit and scope of my invention.

What I claim as new is:

In combination, a supporting structure, a gear casing having divisible parts and adjacent thereto, brackets secured to one of said parts, supporting members extending between said supporting structure and said brackets at opposite ends of the divisible casing, said supporting members being removably secured to said brackets, and means by which the other part of said divisible casing is secured to said brackets, said means being independent of said supporting members.

In testimony whereof I affix my signature, in the presence of two witnesses.

EMMETT W. STULL.

Witnesses:
CHAS. L. BYRON,
ROB. E. STOLL.

Copies of this patent may be obtained for five cents each, by addressing the "Commissioner of Patents, Washington, D. C."